9344X
R. G. Cochran,
Cook Stove.
Patented Feb. 3. 1836.
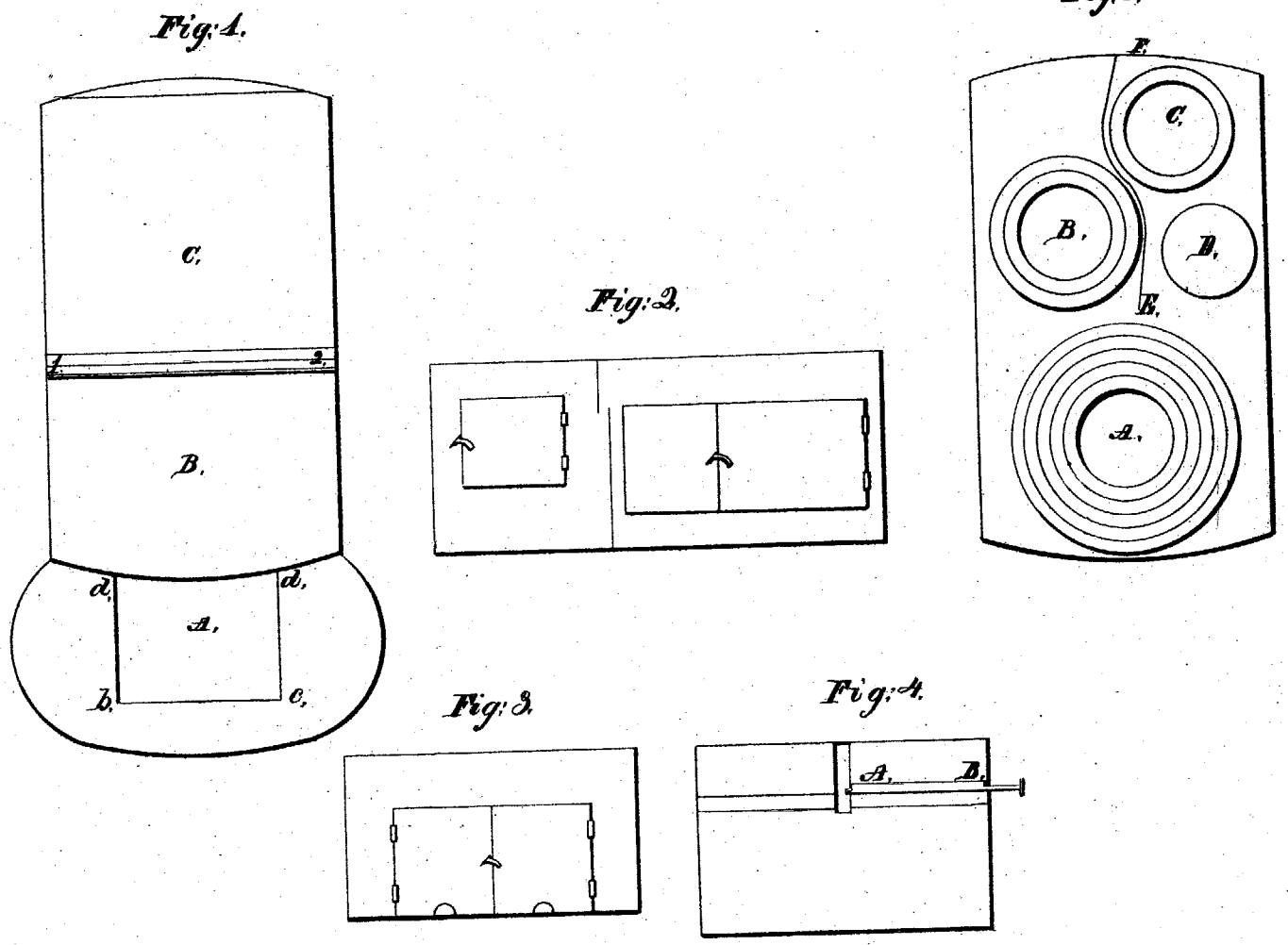

Rodney G. Cochran
Letters Patent

The Schedule referred to in these Letters Patent and making part of the same containing a description in the words of the said Rodney G. Cochran himself of his improvement in the Cooking Stove.

---

To all to whom these Presents shall come
Be it known that I Rodney G. Cochran of Francestown in the County of Hillsborough & State of New Hampshire have invented a new and useful improvement in the Cooking Stove; and, that the following is a full and exact description of the same as improved by me.

The bottom of the said Stove represented by Fig. 1. accompanying this Specification is an iron casting whose surface is represented by the Section A. forming the hearth and the Section B two inches lower than the Section A. forming the fire place of said Stove. A part of the hearth denoted by a bed is also sunk to a level with the fire place and fitted with a cover of cast or thick sheet iron. The remainder of the Stove bottom may be either of cast iron fitted to the part already described or of thick Sheet iron fastened by means of [illegible] to the under side of the cast iron part. The dimensions of the whole Stove bottom are forty inches long by twenty two inches wide; except the hearth, which is twenty five inches in its greater diameter and eleven in its lesser to the Section B. The sunken part of the hearth is eight by twelve inches. The Section B. is seventeen and a half by twenty two inches and has a grate nine inches wide extending across it two inches from the bottom in the part nearest the hearth and is raised by brick work or free stone in the back part to a level with the hearth. The remaining part of the Stove bottom composed of either cast or sheet iron is twenty two inches square, and the whole has a rim near the edge of its upper surface for retaining the upright parts of the Stove in place. These are composed of castings and Russia Sheet iron as follows viz. The front part of the Stove of an iron casting a little circular fourteen inches high by twenty three inches wide containing two doors, each eight inches high by seven wide and is kept in place by the rim
at the edges of the top and bottom of the Stove and by an iron rod passing
perpendicularly through them at each end of said casting, secured by a nut
and screw at the bottom of the Stove.

The sides are composed, in part, each of an iron casting fourteen inches high by
seventeen and a half inches long fitted to the front of the stove and secured in the same
manner by the edges of the top and bottom and by iron rods passing through them
at 1 and 2 Fig 1. These castings have also ears at their farther side for securing
the remaining part of the sides and back of the stove, formed entire of Russia
Sheet iron fourteen inches high, and of such form as to describe the part b. of Fig. 1

One of the sides contains a door eight inches square for supplying the fire with
wood: and one or both an oven door eight by eleven and a half inches, and small
apertures with doors under the oven for removing the ashes which may collect in the
passages to the funnel of the stove. The funnel six inches in diameter is inserted near
the middle of the back. The oven extends across the Stove and is seventeen inches wide
and eight inches high, leaving a space of two inches under it and four above with
a sufficient space behind it for the passage of the fire to the funnel of the stove.

. . . . The oven except the ends which are formed by the sides of the stove is of thick
Sheet iron riveted together and to the sides and supported by an iron casting to wh.
it is riveted, on the side next the fire, and by an iron rod at each corner on the othe.

The iron casting between the oven and the back of the fire place is ten inches
high extending across the Stove and kept in place by grooves in the side castings of
the Stove at a distance, at a distance of one and a half inches from the bottom and
two and a half inches from the top of the Stove. It serves to protect the oven from the im
mediate action of the fire, and to divide the fire equally in its passage over & beneath
the oven. There is a space for the passage of the fire between the oven and the back of the
fire place; three fourths of an inch in width, and divided into two equal parts by a
projection from the back of the fire place. The back of the fire place is composed of two
castings one nine and a fourth inches high from the bottom of the Stove with the proje
tion before mentioned three fourths of an inch wide and a perpendicular part exten
ding above it to the top of the Stove and also jutting beyond on the side next the f
place; two and a fourth inches wide and one and three fourths inches thick fo farther dividing the passages for the fire and to receive one end of the dampers herein after described. The casting is secured by projections from the sides of the Stove and by the iron rods at the points [illegible] Fig. 1. The other casting of the back of the fire-place is five inches wide from the top of the Stove and secured by grooves in the sides at a distance of one inch forward of the lower casting: There are thus formed two passages for the fire upward, each an inch wide and about nine inches long. Each of these has a damper one and a half inches wide ~~and~~ one half inch thick and nine inches long besides its axis of the form A B. in fig IV which shuts down upon a slight rim at the lower edge of the upper casting and closes the upward passage of the fire upon either side or may be turned back by the handle at the outside of the Stove so as to close the passage under the oven or being fixed with the wing of it in a perpendicular position (which is done by drawing the damper a little from the centre towards the side of the Stove) allows the fire to pass equally over and under the oven.

The division at the back of the fireplace is continued over the oven by a sheet or cast iron partition denoted by the line E F on Fig V and by a similar ~~[illegible]~~ partition under the oven, The top of the Stove is an iron casting with a level surface and orifices for Kettles and other furniture represented by circles upon Fig V. Its dimensions are the same with the bottom exclusive of the hearth. The orifices upon the top are closed by cast iron lids with bales of wire: the larger orifices having a lid within a lid for varying the size of the orifice.

—— Petitioner claims as his invention and improvement in the Cooking Stove the form and construction of the apertures for the passage of the fire, and the dampers for closing either of them or the passage under the oven and the division of the passages for the fire by partitions, whereby the whole volume of the fire is thrown upon one side of the Stove, and a quarter heat thus produced on that side and various degrees are produced in different parts of the Stove at the same time suitable for the different processes of cooking, and with less fuel than in any other Stove of equal dimensions In testimony that the above is a true specification of my said improvement as above described I have hereunto set my hand this c

9344 X 2-3-1836 4.

ninth day of November anno Domini 1835.

Rodney G. Cockran

Witnesses.
Saml. Smith
Charles H. Starrett.

Grd. (Patented third Febr. 1836)
Rec.d & Recorded anew Septr. 19. 1840.) (1371 Words)

(Deaverry.)